US009382927B2

(12) United States Patent
Ankargren et al.

(10) Patent No.: US 9,382,927 B2
(45) Date of Patent: Jul. 5, 2016

(54) APPARATUS AND METHOD FOR RECUPERATION OF HYDRAULIC ENERGY

(75) Inventors: David Bengt Johan Ankargren, Kristiansand (NO); Jochen Pohl, Gothenburg (SE)

(73) Assignee: NATIONAL OILWELL VARCO NORWAY AS, Kristiansand (NO)

( * ) Notice: Subject to any disclaimer, the term of this patent is extended or adjusted under 35 U.S.C. 154(b) by 783 days.

(21) Appl. No.: 13/698,952

(22) PCT Filed: May 18, 2011

(86) PCT No.: PCT/NO2011/000154
§ 371 (c)(1),
(2), (4) Date: Dec. 14, 2012

(87) PCT Pub. No.: WO2011/145947
PCT Pub. Date: Nov. 24, 2011

(65) Prior Publication Data

US 2013/0199168 A1 Aug. 8, 2013

(30) Foreign Application Priority Data

May 20, 2010 (NO) .................................... 20100738

(51) Int. Cl.
*F16D 31/02* (2006.01)
*F15B 21/14* (2006.01)
*B66C 13/02* (2006.01)
*F15B 1/02* (2006.01)

(52) U.S. Cl.
CPC ................. *F15B 21/14* (2013.01); *B66C 13/02* (2013.01); *F15B 1/02* (2013.01); *F15B 2211/20546* (2013.01); *F15B 2211/20569* (2013.01); *F15B 2211/212* (2013.01); *F15B 2211/265* (2013.01); *F15B 2211/625* (2013.01); *F15B 2211/6336* (2013.01); *F15B 2211/761* (2013.01); *F15B 2211/88* (2013.01)

(58) Field of Classification Search
CPC ........................................................ F15B 1/02
USPC ..................................................... 60/414, 421
See application file for complete search history.

(56) References Cited

U.S. PATENT DOCUMENTS 3,627,451 A 12/1971 Kouns
3,922,854 A * 12/1975 Coeurderoy .................... 60/413
(Continued)

FOREIGN PATENT DOCUMENTS

CN 100427771 C 10/2008
EP 2113672 A1 11/2009
(Continued)

OTHER PUBLICATIONS

US 3,693,039, 06/1976, Coeurderoy (withdrawn).*
(Continued)

*Primary Examiner* — Nathaniel Wiehe
*Assistant Examiner* — Dustin T Nguyen
(74) *Attorney, Agent, or Firm* — Conley Rose, P.C.

(57) ABSTRACT

An apparatus for recuperation of hydraulic energy from an actuator comprises a first hydraulic machine having a first drive and a second hydraulic machine having a second drive mechanically coupled to the first drive. The first hydraulic machine is in hydraulic communication with an actuator, and the second hydraulic machine (20) is in hydraulic communication with an accumulator.

13 Claims, 5 Drawing Sheets

(56) References Cited

U.S. PATENT DOCUMENTS

| | | | | |
|---|---|---|---|---|
| 6,460,332 | B1 | 10/2002 | Maruta et al. | |
| 7,234,298 | B2 * | 6/2007 | Brinkman et al. | 60/414 |
| 7,249,457 | B2 | 7/2007 | Raszga et al. | |
| 7,891,181 | B2 * | 2/2011 | Baltes | 60/414 |
| 8,701,397 | B2 * | 4/2014 | Tanaka et al. | 60/329 |
| 2001/0035011 | A1 | 11/2001 | Endo et al. | |
| 2009/0165450 | A1 * | 7/2009 | Cherney et al. | 60/413 |
| 2009/0241534 | A1 * | 10/2009 | Tikkanen et al. | 60/413 |
| 2009/0266067 | A1 * | 10/2009 | Persson et al. | 60/327 |

FOREIGN PATENT DOCUMENTS

| | | | | |
|---|---|---|---|---|
| JP | 11002212 | A | 1/1999 | |
| JP | 2004028212 | A | 1/2004 | |
| JP | WO2009/119277 | * | 10/2009 | F15B 11/02 |

OTHER PUBLICATIONS

PCT/NO2011/000154 International Search Report Dated Aug. 16, 2011 (3 p.).

PCT/NO2011/000154 Written Opinion Dated Aug. 16, 2011 (5 p.).

* cited by examiner

APPARATUS AND METHOD FOR RECUPERATION OF HYDRAULIC ENERGY

CROSS-REFERENCE TO RELATED APPLICATIONS

This application is a 35 U.S.C. §371 national stage application of PCT/NO2011/000154 filed May 18, 2011, which claims the benefit of Dutch Patent Application No. 20100738 filed May 20, 2010, both of which are incorporated herein by reference in their entireties for all purposes.

STATEMENT REGARDING FEDERALLY SPONSORED RESEARCH OR DEVELOPMENT

Not applicable.

BACKGROUND

1. Field of Invention

The invention relates generally to an apparatus for recuperation of hydraulic energy. More particularly, the invention relates to an apparatus for recuperation of hydraulic energy, typically from an actuator, typically a hoist, where a first drive of a first hydraulic machine and a second drive of a second hydraulic machine are mechanically connected, and where the first hydraulic machine is in hydraulic communication with an actuator. The invention also relates to a method for operation of the apparatus.

2. Background of the Technology

Hydraulic hoisting systems are included in an array of equipment such as offshore and land based drilling rigs, winches and equipment. The hoisting systems are regarded as the backbone of a rig in terms of handling a drill as well as controlling a drilling process.

Several of these hoisting systems exhibit a cyclic load profile where a load is repeatedly lifted and lowered. At least in some of the prior art hoisting systems potential energy is dissipated as heat during lowering of the load.

Such systems are characterized by a large variation in the operational envelope in terms of hook load and lifting speed, as well as duration of a particular operation. The hoisting system is thus dimensioned in order to fulfill the maximum power requirements given by a certain operation. Therefore, the hydraulic power unit of a typical hoisting system consists of several hydraulic machines.

It is known to recuperate at least some of such potential energy by utilization of a hydraulic transformer. U.S. Pat. No. 3,627,451 discloses a hydraulic transfer unit for transferring hydraulic power at the same pressures and in either direction between two separate and isolated hydraulic control systems.

U.S. Pat. No. 7,249,457 discloses a hydraulic system that has gravitational load energy recuperation by opening a recuperation piloted valve with a pilot pressure supplied by a hydraulic pump so as to drive a recuperation hydraulic motor with a source of fluid pressurized by gravity from the load. The recuperation hydraulic motor drives the mechanical drive train of a prime mover that drives the pump that supplies the load, and other pumps that supply other loads.

None of the prior art documents discloses an energy management system for cyclic load profiles in order to estimate the energy recuperation potential to a hoisting system where energy is stored in an accumulator.

The purpose of the invention is to overcome or reduce at least one of the disadvantages of the prior art.

BRIEF SUMMARY OF THE DISCLOSURE

The purpose is achieved according to the invention by the features as disclosed in the description below and in the following patent claims.

There is provided an apparatus for recuperation of hydraulic energy from an actuator, typically a hoist, where a first drive of a first hydraulic machine and a second drive of a second hydraulic machine are mechanically connected, and where the first hydraulic machine is in hydraulic communication with the actuator, wherein the second hydraulic machine is in hydraulic communication with an accumulator.

At least the first or second hydraulic machine is here typically a machine that is designed to operate as a variable displacement pump and motor, for example an over-centre type pump/motor. The term “displacement” is taken to mean displacement per revolution of the pump/motor.

The actuator may take the form of a hydraulic ram, a hydraulic pump/motor or any other suitable hydraulic equipment capable of lifting a load directly or via machine elements such as a gear, a rope or a pulley.

The accumulator may be a gas/liquid type of accumulator where a gas, typically nitrogen, is compressed by hydraulic fluid flowing into a closed bottle. The accumulator may also be of another commonly known art, for example a hydraulic ram acting against a spring. As the pressure of the accumulator is charge dependent, the accumulator pressure is utilized for indicating the actual charge of the accumulator.

By regulating the displacement of the second hydraulic machine it is possible to charge the accumulator at a higher pressure than the pressure driving the first hydraulic machine during lowering of the load.

The drives of the first and second hydraulic machines may be connected to an electric motor. Although the motor is termed “electric motor” mainly in order to differentiate this motor from machines acting as hydraulic motors, the motor may take the form of a prime mover such as one or more of an electric motor, a combustion engine or a hydraulic motor that is driven by a separate hydraulic circuit.

The electric machine that is connected to the two hydraulic machines serves several purposes. The connection between the two shafts of two hydraulic displacement machines is in the art called a hydraulic transformer. Hydraulic transformer control is known to exhibit difficulties, especially due to non-linearities in a control loop and the machines comparably low inertia compared to the systems pressure level. Here the electric machine adds inertia which eases the control problem. However, the electric machine is even used in order to supply additional power that is dissipated in the hydro-mechanical conversion process, see FIG. 2.

The apparatus may include a first valve that is in hydraulic communication with the second fluid machine, the actuator and the accumulator. The first valve is operable between a first position where the second fluid machine is connected to the accumulator, and a second position where the second fluid machine is connected to the actuator.

By operating the first valve to the second position the apparatus may be operated in a conventional manner without recuperation.

The apparatus may further include a second valve that is in hydraulic communication with the accumulator and the actuator, and where the second valve is operable between an open and a closed position.

By opening the second valve, pressurized hydraulic fluid from the accumulator may flow directly between the accumulator and the actuator, for example for boost usage during conventional operation.

In an alternative embodiment the apparatus may include a third valve that is hydraulically positioned between at least the first hydraulic machine or the second hydraulic machine and the reservoir. Normally there is one third valve for each hydraulic machine. The function of the third valve is to direct the flow from the hydraulic machines to the accumulator.

This function is particularly useful for accumulator charging from lowering loads such as after system operation with boost accumulator usage. The apparatus may include a controller that receives information of at least the relative position of the load and the hydraulic pressure in the accumulator, and based on this information and input from a conventional control system, controls the displacement of the first and second hydraulic machines as well as the power of the electric motor. The controller may be part of the control system that may receive information of the desired load position from say, an operator or a heave compensation system.

The apparatus may be operated by use of a method for recuperation of hydraulic energy from an actuator during part load conditions where more than one hydraulic pump is designed to supply hydraulic fluid to the actuator, wherein the method includes:

- joining at least two pumps mechanically for torque transmission them between, whereby one pump becomes a first hydraulic machine and an other pump becomes a second hydraulic machine;
- arrange a first valve in an actuator pipe between the actuator and the second hydraulic machine;
- activate the first valve to divert hydraulic fluid from the second hydraulic machine away from the actuator when the actuator is supplying hydraulic fluid to the first hydraulic machine.

The method for recuperation of hydraulic energy is suitable for use on a hydraulic apparatus that may include a first drive of a first hydraulic machine and a second drive of a second hydraulic machine are mechanically connected and connected to an electric motor, and where the first hydraulic machine is in hydraulic communication with an actuator, wherein the method may include:

- connecting the second hydraulic machine hydraulically to an accumulator;
- connecting a controller that is designed to control the displacement of the first hydraulic machine, the second hydraulic machine and the motor power to said machines and motor;
- supplying values of load position, actuator pressure and accumulator pressure to the controller; and
- calculating the displacement of the first hydraulic machine, the second hydraulic machine and the motor power based on the values of the load position, actuator pressure and accumulator pressure to the controller.

A controller for this purpose may be designed with the help of one of several methods known to those skilled in the art of control engineering. A principal open loop controller can be stated as follows:

$$\varepsilon_{main} = \frac{i_p \cdot A_p \cdot v_{req}}{D_{m,main} \cdot i_{m,main} \cdot n_{el}} \quad (1)$$

$$\varepsilon_{rec} = \frac{i_p \cdot A_p \cdot v_{req}}{D_{m,rec} \cdot i_{m,rec} \cdot n_{el}} \cdot \frac{P_{Load}}{P_{Acc}} \quad (2)$$

where the $D_{m;main}$ and $D_{m;rec}$ denote the maximum displacement of main machine and the machine intended for energy recuperation respectively, ϵ denotes the displacement ratio of the two machines and $i_{m;main}$ and $i_{m;rec}$ the number of machines for the two separate purposes. The parameter $i_p$ denotes the number of hydraulic cylinders and $A_p$ their area, the variables $P_{Load}$ and $P_{Ace}$ denote the load and accumulator pressures respectively. The variable $v_{req}$ denotes the require piston speed, and $n_{el}$ the shaft speed of the electric machine.

The method may further include:

define or identify type of cycle;

enter a control loop:

estimate recuperation potential;

reconfigure the first and second hydraulic machines and electric motor power;

monitor and control accumulator charge;

finish cycle.

The step of a flow chart carried out by the controller during operation may thus include a first step where the type of cycle is defined or identified, a second step where the recuperation potential is estimated. In a third step the hydraulic machines as well as the electric motor are reconfigured accordingly to findings in the second step. A fourth step includes monitoring and control of the charge of the accumulator. The state of the accumulator charge as defined in the fourth step may require a new estimation of the recuperation potential in the second step. The cycle is finished in a fifth step that is entered when the load has reached a desired position.

Change in operational details may be applicable depending on local conditions. The operation will include estimation of available energy for recuperation and control of the second hydraulic machine to recover a major part of available energy to the accumulator, as well as estimation of available energy in the accumulator for use and control of the second hydraulic machine to utilize the major part.

The apparatus according to the invention is well suited for emergency operation if the electric motor should fail or for providing hydraulic power to other systems.

It is a major benefit of the proposed apparatus that only minor redesign from today's design is necessary, and that no major additional components are required.

It is assumed that the apparatus and method according to the invention best relates to operating conditions significantly below the maximum specification. During these conditions, the existing components can be utilized in a different way, so that energy recuperation can be made possible. In that manner, the recuperated energy from a lowering load can be utilized for a subsequent lifting, so that the installed power of the entire system can be reduced.

BRIEF DESCRIPTION OF THE DRAWINGS

Below, an example of a preferred apparatus and method is explained under reference to the enclosed drawings, where.

DETAILED DESCRIPTION OF THE PREFERRED EMBODIMENTS

On the drawings the reference number 1 denotes a vessel that includes a crane 2. A load 4 is suspended from the crane 2 and lifted by an actuator 6.

Figure 1:
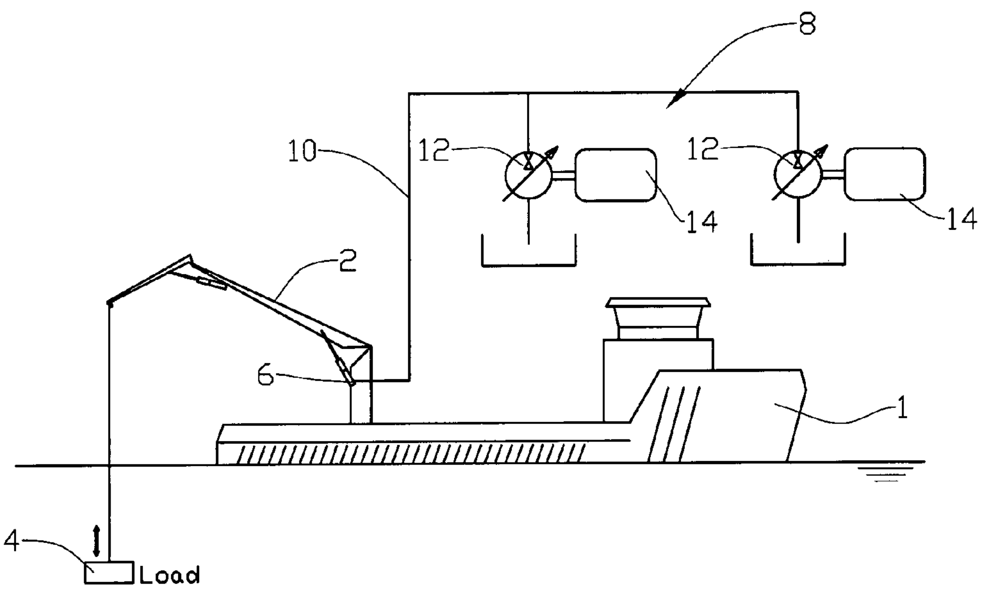
FIG. 1 shows a principle sketch of a vessel having a crane that is operated by a hydraulic apparatus according to prior art.

According to prior art as shown in FIG. 1, the actuator 6 is connected to a hydraulic apparatus 8 by a pipe 10. The apparatus 8 includes at least two variable hydraulic pumps 12 that are driven by their own electric motor 14.

When lifting the load 4, all energy is delivered by one or more of the electric motors 14. When lowering the load 2, the potential energy is dissipated as heat.

Figure 2:
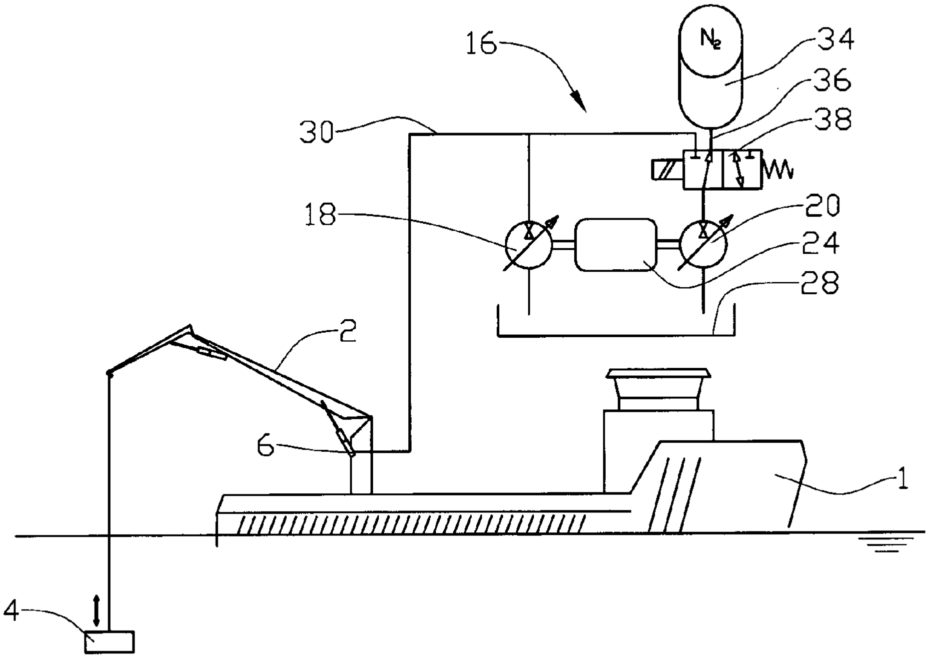
FIG. 2 shows the same as in FIG. 1, but with a hydraulic apparatus according to the present invention.

In FIG. 2 the vessel 1 is equipped with a hydraulic apparatus 16 for recuperation of potential energy from the load 4.

Figure 3:
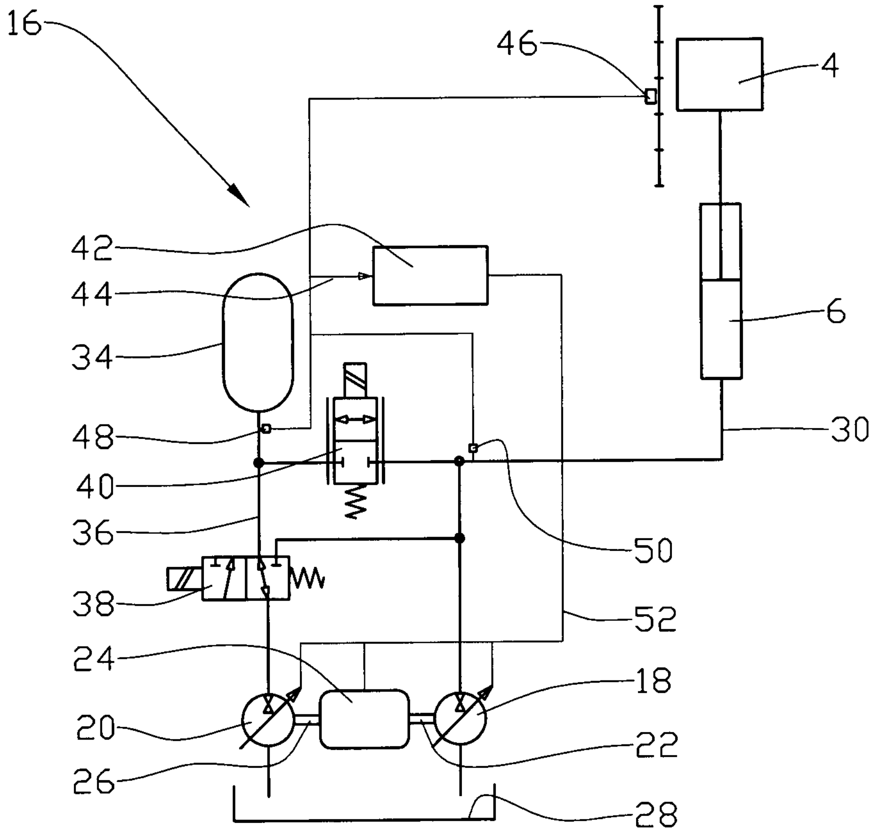
FIG. 3 shows a diagram of the principal hydraulic and control circuits of the apparatus.

The hydraulic apparatus 16, that is shown in more detailed in FIG. 3, includes a first hydraulic machine 18 and a second hydraulic machine 20, both designed to operate as variable pumps/motors.

The first hydraulic machine 18 has a first drive 22 in the form of a shaft that is connected to an electric motor 24. The electric motor 24 is connected to the second hydraulic machine 20 via a second drive 26 also in the form of a shaft. The first and second drives 22, 26 are thus mechanically connected through the electric motor 24.

Both hydraulic machines 18, 20 communicate with a reservoir 28 for hydraulic fluid.

The first hydraulic machine 18 is connected to the plus-side of an actuator 6 via an actuator pipe 30. The actuator 6, in the form of a hydraulic ram, carries a load 4. When the first hydraulic machine 18 supplies hydraulic fluid via the actuator pipe 30 to the actuator 6, the load 4 is lifted.

The second hydraulic machine 20 is connected to an accumulator 34 via an accumulator pipe 36. A first valve 38 is coupled to the accumulator pipe 36 and to the actuator pipe 30. When activated, the first valve 38 divert the hydraulic connection of the second hydraulic machine 20 from the accumulator 34 and to the actuator 6 as it may be necessary to supply the actuator 6 with hydraulic fluid from both hydraulic machines 18, 20 when the accumulator is working close to its design load and speed.

A second valve 40, see FIG. 3, is connected between the actuator pipe 30 and the accumulator pipe 36. When activated, the second valve 40 allows flow of hydraulic fluid between the accumulator 34 and the actuator 6.

A controller 42 receives, via sensor cables 44, information of the relative load position from a position sensor 46, accumulator pressure from a first pressure sensor 48 and accumulator pressure from a second pressure sensor 50.

The controller 42 is designed to control the first and second hydraulic machines 18, 20 and the electric motor 24 via control cables 52.

Figure 7:
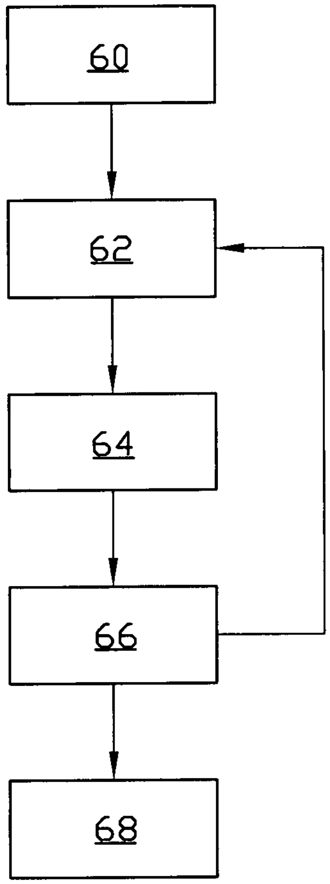
FIG. 7 shows a flow chart of the steps included in the method according to the invention.

FIG. 7 shows a flow chart indicting steps carried out by the controller 42 during operation. In step 60 the type of cycle is defined or identified. In step 62 the recuperation potential is estimated. The hydraulic machines 18, 20 as well as the electric motor 24 are reconfigured accordingly in step 64. A step 66 includes monitoring and control of the charge of the accumulator 34. The charge of the accumulator 34 as defined in step 66 may require a new estimation of the recuperation potential in step 62. The cycle is finished in step 68 when the load 4 has reached a desired position.

The steps 60 to 68 as shown in FIG. 7 may be implemented using software code stored in a media readable by a computer system not shown but included in the controller 42.

Somewhat simplified, the type of cycles experienced in step 60 include lifting, lowering and keeping the load stationary. The actual type of cycle may be identified by an input signal to the controller 42, or by an actual movement of the load 4.

Figure 5:
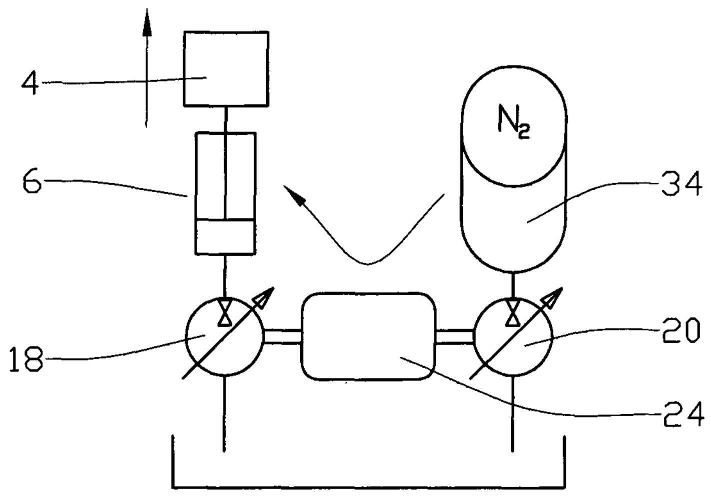
FIG. 5 illustrates the use of recuperated hydraulic energy from the accumulator for lifting a load.

When the actual cycle, as defined or identified in step 60, is set to be lifting of the load 4, the displacement of the first hydraulic machine 18 is governed by the required lifting speed. An arrow in FIG. 5 indicates the energy flow for a lifting cycle.

In step 62 the possible contribution from energy stored in the accumulator 34 is estimated based on information of the accumulators 34 charge. By utilizing this information and the required power in the first hydraulic machine 18, the displacement of the second hydraulic machine 20, acting as a hydraulic motor, is adjusted in step 64. If required, the electrical motor 24 is controlled in step 64 to supply necessary power.

In step 66 the information of the accumulator 34 charge is monitored. Information is returned to step 62. The feed back from step 66 to step 62 implies that a control loop including the steps 62, 64 and 66 will run until step 68 is entered.

The cycle finishes in step 68 when the load 4 has reached an intended position.

Figure 6:
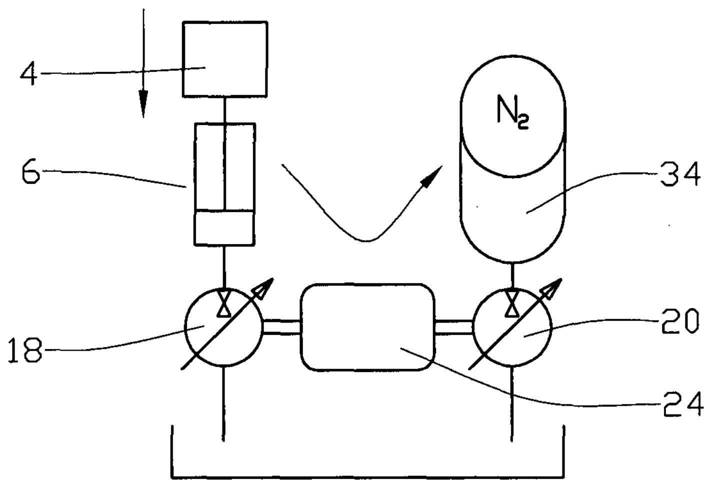
FIG. 6 illustrates the recuperation of potential energy into hydraulic energy for storage in an accumulator.

When the actual cycle, as defined or identified in step 60, is set to be lowering of the load 4, the displacement of the first hydraulic machine 18, acting as an hydraulic motor, is governed by the required lowering speed. An arrow in FIG. 6 indicates the energy flow for a lowering cycle.

In step 62, the recuperation potential is estimated based on the available power from the first hydraulic machine 18 as well as on the available energy storage capacity of the accumulator 34. In step 64 the displacement of the second hydraulic machine 20, acting as a hydraulic pump, is set. In the unlikely event that insufficient storage capacity is available in the accumulator 34, surplus energy may be dissipated as heat in an emergency valve that is not shown.

As previously stated, the information of the accumulator 34 charge is monitored in step 66. Information is returned to step 62. The cycle finishes in step 68 when the load 4 has reached an intended position.

If the cycle as defined or identified in step 60 is set to hold the load 4 stationary, the displacement of first hydraulic machine 18 is regulated to compensate for any leaks, while power for this operation is supplied from the accumulator 34 via the second hydraulic machine 20 and/or the electric motor 24.

Figure 4:
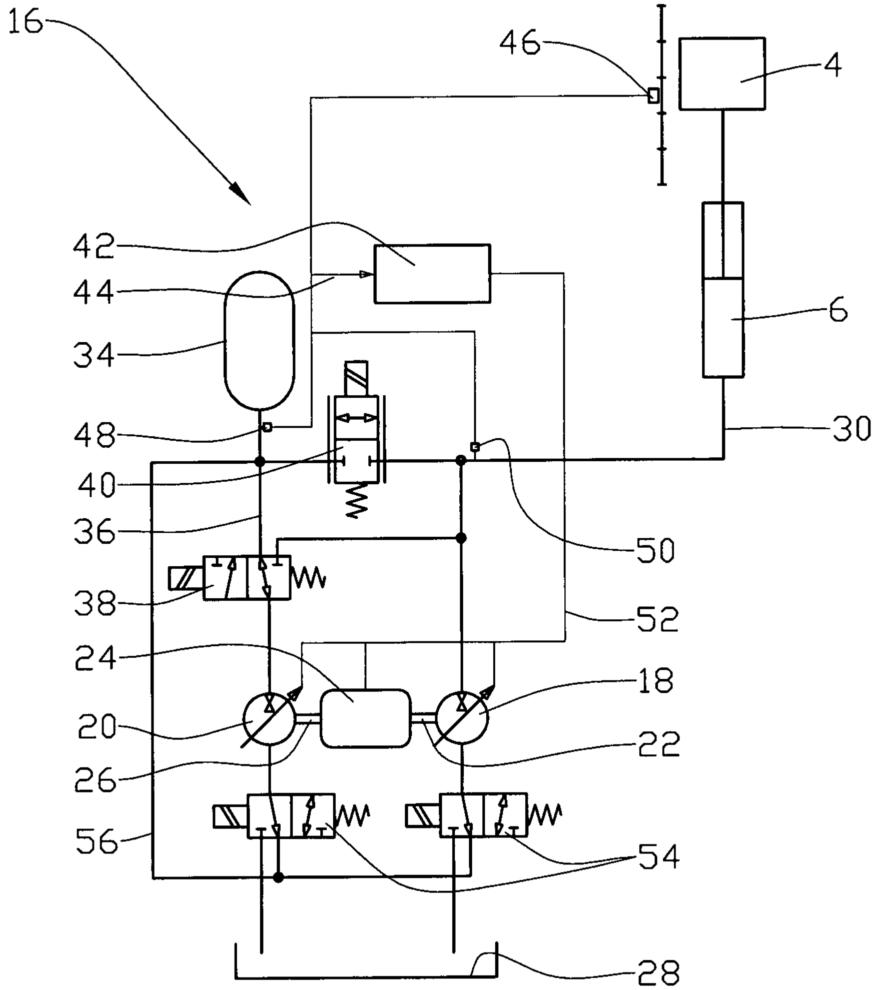
FIG. 4 shows the diagram in FIG. 3, but in an alternative embodiment with additional valves.

In an alternative embodiment, see FIG. 4, third valves 54 are positioned between the first hydraulic machine 18, the second hydraulic machine 20 and the reservoir. A return pipe 56 connects the third valves 54 with the accumulator.

When not activated, the return pipe 56 is closed at the third valves 54, while the return flow from the hydraulic machines 18, 20 to the reservoir 28 is open. When activated, the third valves 54 divert the return flow from the hydraulic machines 18, 20 through the return pipe 56 to the accumulator 34.

As stated in the general part of the description, this function is particularly useful for charging of the accumulator 34 from lowering loads such as after boost accumulator usage.

The invention claimed is:

1. A method for recuperation of hydraulic energy from an actuator during load conditions wherein at least one hydraulic pump is configured to supply hydraulic fluid to the actuator, the method comprising:

mechanically coupling a first hydraulic pump and a second hydraulic pump for torque transmission therebetween;

positioning a first valve in an actuator pipe between the actuator and the second hydraulic pump;

actuating the first valve to divert hydraulic fluid from the second hydraulic pump away from the actuator when the actuator is supplying hydraulic fluid to the first hydraulic pump;

hydraulically connecting the second hydraulic pump to an accumulator;

hydraulically communicating a second valve with the actuator and the accumulator;

actuating a second valve to an open position; and allowing fluid to flow both from the actuator to the accumulator and from the accumulator to the actuator after and as a result of actuating the second valve to the open position.

2. The method of claim 1 wherein a first drive coupled to the first hydraulic pump and a second drive coupled to the second hydraulic pump are mechanically connected to an electric motor, and wherein the first hydraulic pump is in hydraulic communication with the actuator, the method further comprising:

connecting a controller to the first and second hydraulic pumps and the electric motor, wherein the controller is configured to control the displacement of the first hydraulic pump, the second hydraulic pump and the power of the electric motor;

supplying a value of a position of the load, a pressure of the actuator and a pressure of the accumulator to the controller; and calculating a displacement of the first hydraulic pump, the second hydraulic pump and the power of the electric motor based on the values of the position of the load, the pressure in the actuator and the pressure in the accumulator.

3. The method of claim 1, further comprising:

identifying a type of cycle;

executing a control loop comprising:

estimating a recuperation potential;

reconfiguring the first and second hydraulic pumps and electric motor power; and monitoring and controlling a charge of the accumulator; and finishing the cycle.

4. An apparatus for recuperation of hydraulic energy from an actuator, the apparatus comprising:

a first hydraulic machine having a first drive;

a second hydraulic machine having a second drive coupled to the first drive;

wherein the first hydraulic machine is in hydraulic communication with the actuator and the second hydraulic machine is in hydraulic communication with an accumulator;

a first valve in hydraulic communication with the second hydraulic machine, the actuator and the accumulator, wherein the first valve is configured to transition between a first position with the second hydraulic machine in hydraulic communication with the accumulator and a second position with the second hydraulic machine in hydraulic communication with the actuator; and a second valve in hydraulic communication with the actuator and the accumulator, wherein the second valve is configured to transition between an open and a closed position;

wherein when the second valve is in the open position, fluid flow is free to flow both from the accumulator to the actuator and from the actuator to the accumulator through the second valve; and wherein the second valve is in direct communication with the actuator and in direct communication with the accumulator.

5. The apparatus of claim 4, wherein, the first and second drives are connected to an electric motor.

6. The apparatus of claim 5, further comprising:

a controller configured to receive information relating to a position of a load and a hydraulic pressure in the accumulator, and configured to control the displacement of the first and second hydraulic machines and the power of the electric motor.

7. The apparatus of claim 4, further comprising:

a third valve hydraulically positioned between the first hydraulic machine or the second hydraulic machine and a reservoir;

wherein the third valve is in hydraulic communication with the reservoir and is configured to transition between a first position with the return flow between the first or second hydraulic machine and the reservoir open and hydraulic communication with the accumulator is closed, and a second position with flow from the first or second hydraulic machine diverted to the accumulator.

8. The apparatus of claim 4, wherein the first valve is disposed along an accumulator line extending from the accumulator to the second hydraulic machine; and wherein the second valve is disposed along an actuator line extending from the accumulator line to the actuator.

9. The apparatus of claim 8, wherein the actuator line is connected to the accumulator line at a point between the first valve and the accumulator.

10. The apparatus of claim 8, wherein when the first valve is in the first position, fluid is free to flow from the second hydraulic machine to the accumulator along the accumulator line and through the first valve; and wherein when the first valve is in the second position, fluid is free to flow from the second hydraulic machine, through the first valve, to the actuator line and is prevented from the flowing from the second hydraulic machine, through the first valve, to the accumulator along the accumulator line.

11. The apparatus of claim 10, wherein when the first valve is in the second position, fluid is free to flow from the second hydraulic machine, through the first valve, to the actuator line at a point between the second valve and the actuator.

12. An apparatus for recuperation of hydraulic energy from an actuator, the apparatus comprising:

a first hydraulic pump having a first drive, wherein the first hydraulic pump is in fluid communication with the actuator;

a second hydraulic pump having a second drive coupled to the first drive;

an accumulator line extending from the second hydraulic pump to an accumulator;

a first valve disposed along the accumulator line;

an actuator line extending from the accumulator line, at a point between the first valve and the accumulator, to the actuator; and a second valve disposed along the actuator line;

wherein the first valve is configured to transition between:

a first position to allow fluid to flow from the second hydraulic pump to the accumulator along the accumulator line and through the first valve; and a second position to allow fluid to flow from the second hydraulic pump through the first valve to the actuator line at a point between the second valve and the actuator.

13. The apparatus of claim 12, wherein the second valve is configured to transition between an open position and a closed position;

wherein the second valve is in the closed position, fluid is prevented from flowing from the accumulator along the accumulator line to the actuator.

* * * * *